US012763703B2

(12) United States Patent
De Marco

(10) Patent No.: US 12,763,703 B2
(45) Date of Patent: Oct. 13, 2026

(54) CONTROLLER AND METHOD FOR OPERATING AN INVERTER USING MULTIPLE SWITCHING PATTERNS

(71) Applicant: Renesas Design (UK) Limited, Bourne End (GB)

(72) Inventor: Louis De Marco, Swindon (GB)

(73) Assignee: Renesas Design (UK) Limited, Bourne End (GB)

( * ) Notice: Subject to any disclaimer, the term of this patent is extended or adjusted under 35 U.S.C. 154(b) by 186 days.

(21) Appl. No.: 18/395,957

(22) Filed: Dec. 26, 2023

(65) Prior Publication Data

US 2025/0211134 A1 Jun. 26, 2025

(51) Int. Cl.

*H02M 1/00* (2007.01)
*H02M 7/483* (2007.01)
*H02M 7/539* (2006.01)

(52) U.S. Cl.

CPC ......... *H02M 7/539* (2013.01); *H02M 1/0003* (2021.05)

(58) Field of Classification Search

CPC .. H02M 7/539; H02M 7/5395; H02M 7/4837; H02M 1/0003; H02M 1/0012; H02M 1/0054; H02M 1/44

See application file for complete search history.

(56) References Cited

U.S. PATENT DOCUMENTS

| | | | | |
|---|---|---|---|---|
| 5,992,950 | A * | 11/1999 | Kumar | B60L 7/22 303/151 |
| 9,548,688 | B2 * | 1/2017 | Satou | H02P 21/22 |
| 2014/0292240 | A1 * | 10/2014 | Tabata | H02P 23/14 318/400.15 |
| 2016/0258993 | A1 * | 9/2016 | Bagchi | G01R 31/52 |
| 2018/0241337 | A1 * | 8/2018 | Zou | B60L 3/003 |
| 2018/0334043 | A1 * | 11/2018 | Zou | H02M 1/08 |
| 2023/0253883 | A1 | 8/2023 | Cannillo et al. | |
| 2024/0198809 | A1 * | 6/2024 | Zhang | B60L 50/60 |

* cited by examiner

*Primary Examiner* — Sisay G Tiku
(74) *Attorney, Agent, or Firm* — SCULLY, SCOTT, MURPHY & PRESSER, P.C.

(57) ABSTRACT

A controller for an inverter, the inverter comprising a plurality of switches, the controller configured to generate a control signal wherein the control signal operates the plurality of switches in a first switching pattern or a second switching pattern.

18 Claims, 13 Drawing Sheets

800

CONTROLLER AND METHOD FOR OPERATING AN INVERTER USING MULTIPLE SWITCHING PATTERNS

The present disclosure relates to a controller for an inverter. In particular, the present disclosure relates to a controller for an inverter and the configuration of switches in the inverter for use in an electric vehicle power system.

BACKGROUND

Inverters are used for DC/AC power conversion. In particular, traction inverters are often used in electric vehicle power systems as well as for the driving of electric motors or for use in DC/AC conversion.

SUMMARY

In the increasing electrification of vehicles, it is desirable to design electric vehicle systems that are efficient and cost effective whilst also improving the power density from battery to wheels.

According to a first aspect of the disclosure there is provided a controller for an inverter, the inverter comprising a plurality of switches, the controller configured to generate a control signal wherein the control signal operates the plurality of switches in a first switching pattern or a second switching pattern.

Optionally, the controller is configured to receive a first input and/or a second input.

Optionally, the control signal operates the plurality of switches in the first switching pattern if the first input is less than the second input.

Optionally, the control signal operates the plurality of switches in the second switching pattern if the first input is greater than the second input.

Optionally, the inverter is configured to operate in a first phase and a second phase.

Optionally, when the plurality of switches are operated in the first switching pattern, a current flowing through the inverter switches between a first current path and a second current path.

Optionally, during the first phase the current flowing through the inverter flows from a battery to an output and during the second phase the current flowing through the inverter flows from the output to the battery.

Optionally, the first current path comprises a first switch and a second switch and the second current path comprises a third switch and a fourth switch.

Optionally, the generated control signal switches the current flow between the first current path and the second current path by alternately switching the second switch and the fourth switch between an on state and an off state.

Optionally, the first current path comprises a first switch and a second switch and the second current path comprises the second switch and a third switch.

Optionally, the generated control signal switches the current flow between the first current path and the second current path by alternately switching the first switch and the third switch between an on state and an off state.

Optionally, when the plurality of switches are arranged in the second switching pattern, a current flowing through the inverter switches between a third current path and a fourth current path.

Optionally, during the first phase the current flowing through the inverter flows from the battery to the output and during the second phase the current flowing through the inverter flows from the output to the battery.

Optionally, the third current path comprises a first switch, a second switch and a capacitor and the fourth current path comprises the second switch, a third switch, a fourth switch and the capacitor.

Optionally, the generated control signal switches the current flow between the third current path and the fourth current path by alternately switching the first switch and the third switch and the fourth switch between an on state and an off state such that the third switch and the fourth switch are always in the same state.

Optionally, the third current path comprises a first switch, a second switch and a capacitor.

Optionally, during the second phase the fourth current path comprises the first switch and a third switch and during the first phase the fourth current path comprises the second switch, a fourth switch and the capacitor.

Optionally, during the second phase the generated control signal switches the current flow between the third current path and the fourth current path by alternately switching the second switch and the third switch between an on state and an off state and wherein during the first phase the generated control signal switches the current flow between the third current path and the fourth current path by alternately switching the first switch and the fourth switch between an on state and an off state.

According to a second aspect of the disclosure there is provided an apparatus comprising an inverter comprising a plurality of switches, and a controller for the inverter, the controller configured to generate a control signal wherein the control signal operates the plurality of switches in a first switching pattern or a second switching pattern.

Optionally, the apparatus is an electric vehicle power system.

It will be appreciated that the apparatus of the second aspect may include features as set out in relation to the first aspect and can incorporate other features as described herein.

According a third aspect of the disclosure there is provided a method of controlling an inverter comprising a plurality of switches, the method comprising generating, using a controller, a control signal to operate the plurality of switches in a first switching pattern or a second switching pattern.

It will be appreciated that the method of the third aspect may include using and/or providing features as set out in the first aspect and/or second aspect, and can incorporate other features as described herein.

BRIEF DESCRIPTION OF THE DRAWINGS

The description is described in further detail below by way of example only and with reference to the accompanying drawings, in which:

FIG. 2(*b*) a second example embodiment of an inverter that can be used with the controller of FIG. 1;

FIG. 3(*b*) is a diagram of the first switching pattern in the second example embodiment of the inverter;

FIG. 4(*b*) is a diagram of the second switching pattern in the second example embodiment of the inverter;

FIG. 6(*b*) is another example embodiment of the controller of the present disclosure for the electric vehicle power system;

DETAILED DESCRIPTION

In electric vehicle (EV) power systems, a 2-level inverter architecture is commonly used.

In order to improve the efficiency and power performance of such systems, a number of methods have been implemented. For example, implementing a battery with a higher voltage in the EV power system can be advantageous. It allows for the development of smaller and cheaper electric motors. However, it is an expensive solution when considering the whole EV power system as it requires a more complex battery management system and the other components in the EV power system (such as the switches in the inverter) are required to have a higher voltage rating. Further, increasing the battery voltage leads to other problems. In particular, the inverter suffers from increased switching losses which impacts the driving range of the EV and can result in thermal management issues.

Another challenge when using 2-level inverters in the EV power systems is that a higher switching frequency is preferable to increase the performance of the electric motor in the vehicle. However, for 2-level inverters an increase in the switching frequency can result in an increase in switching losses. Therefore, there is a limit on how much the switching frequency can be increased by.

Figure 1:
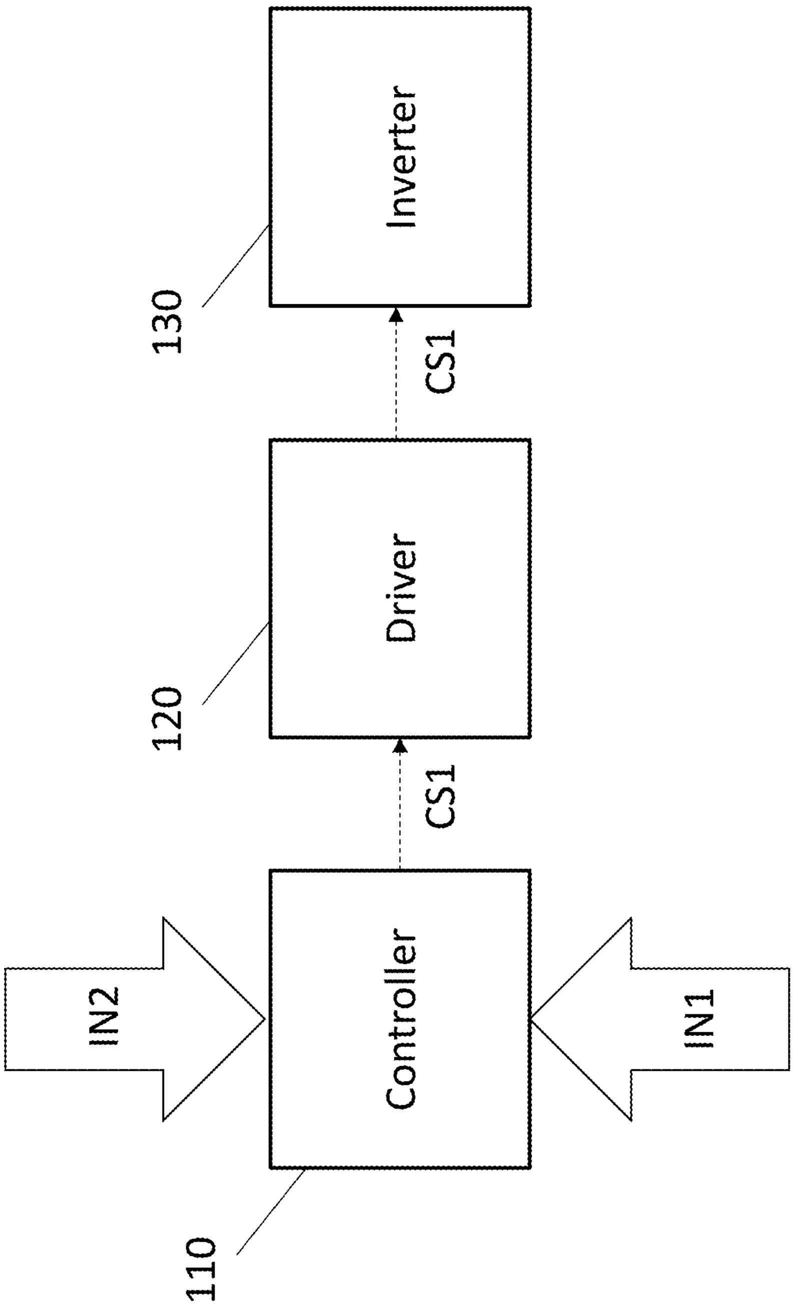
FIG. 1 is a diagram of a controller for an inverter according to the present disclosure.

FIG. 1 is a diagram of a controller 110 for an inverter 130 according to the present disclosure. The inverter 130 comprises a plurality of switches and the controller 110 is configured to generate a control signal CS1 wherein the control signal operates the plurality of switches in a first switching pattern or a second switching pattern. The controller 110 sends the control signal CS1 to a driver 120. The driver 120 processes the signal in order to operate the plurality of switches within the inverter 130. The driver 120 could comprise, for example, a one or more gate driver units (GDU). The number of GDUs may be equal to the number of switches within the inverter 130.

In a specific embodiment, the controller 110 is configured to receive a first input IN1 and/or a second input IN2.

One or both inputs IN1, IN2 may be received from an external location to the controller 110, or may be provided internally within the controller 110.

For example, the controller 110 may be configured to receive the first input IN1 from an external location and the second input IN2 from an internal location.

For example, the second input IN2 may be received from a memory element within the controller 110. The memory element may be pre-programmed with a look up table, with at least a portion of the data within the look up table being provided as the second input IN2.

The value of the first input IN1 and the second input IN2 determines which switching pattern the control signal CS1 operates the plurality of switches in. If the first input IN1 is less than the second input IN2, then control signal CS1 operates the plurality of switches in the first switching pattern. If the first input IN1 is greater than the second input IN2, then the control signal CS1 operates the plurality of switches in the second switching pattern.

Figure 2A:
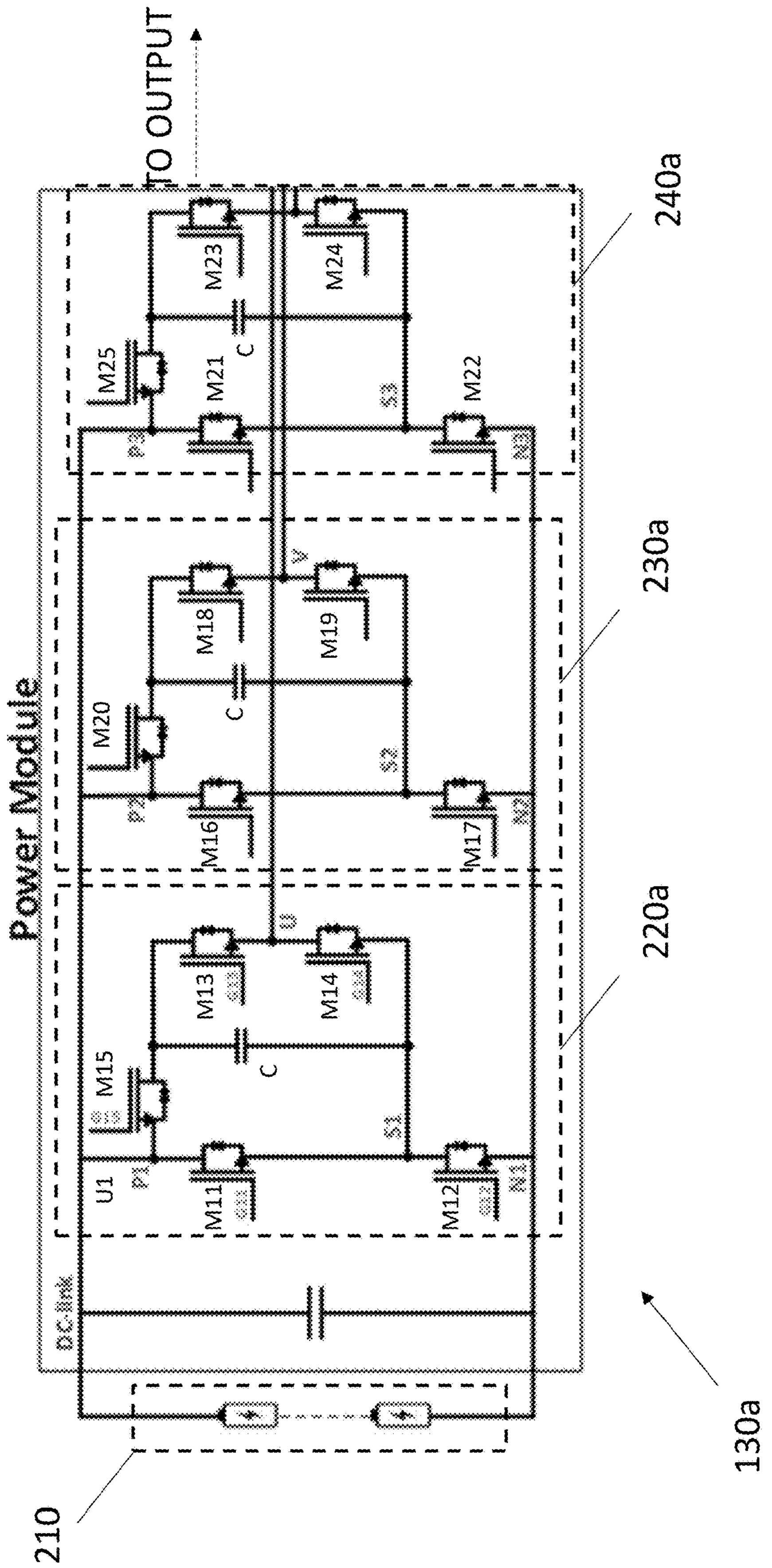
FIG. 2(*a*) is a first example embodiment of an inverter that can be used with the controller of FIG. 1.
Figure 2B:
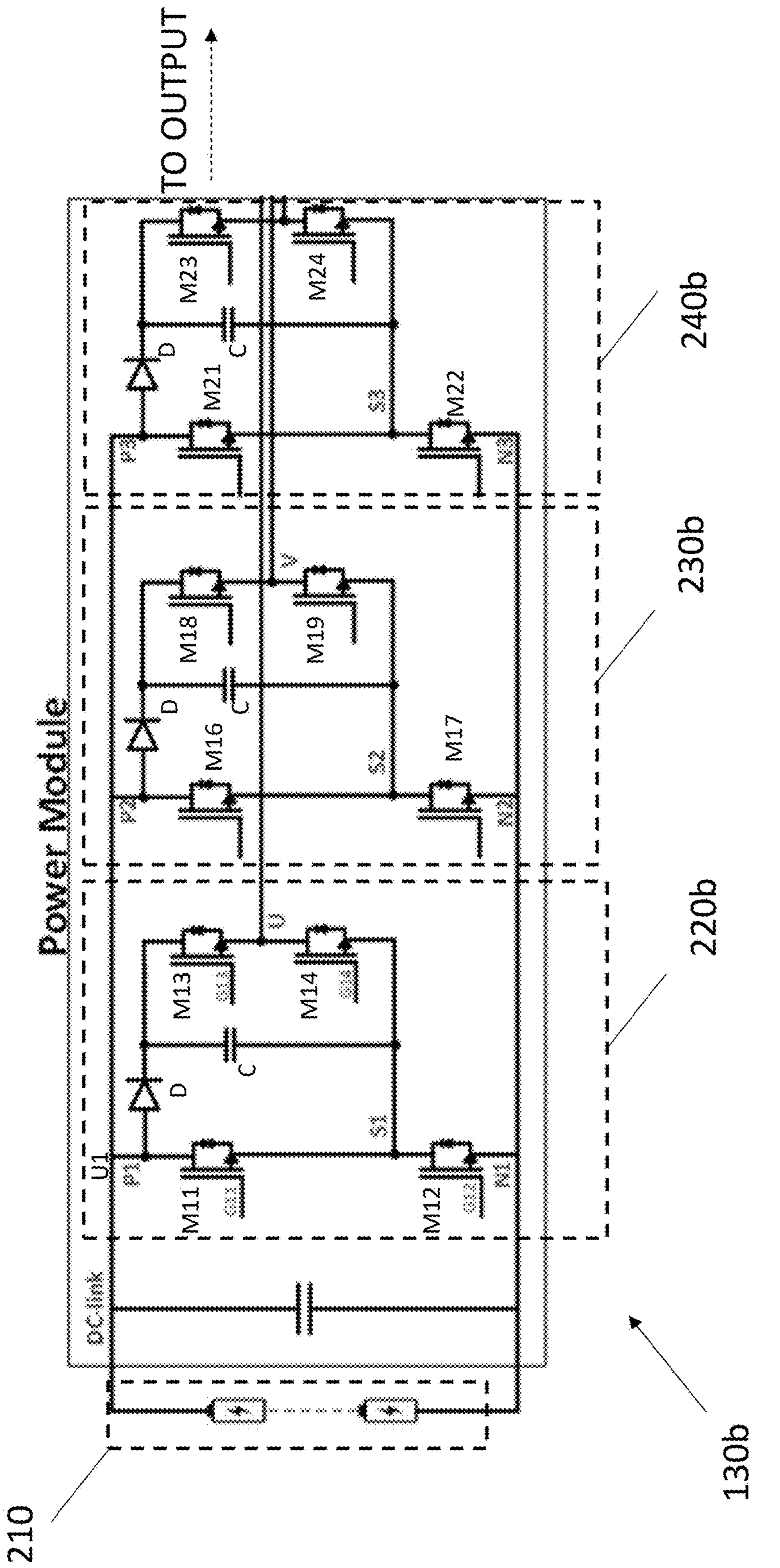

FIG. 2(*a*) shows a first example embodiment of an inverter 130*a* that can be controlled by the controller 110 of FIG. 1. The inverter 130*a* comprises a battery 210 coupled to a capacitor DC-link. The capacitor DC-link can have a voltage, for example, from 400 volts to 800 volts depending on the use for the inverter. The inverter 130*a* further comprises one or more legs 220*a*, 230*a*, 240*a* which comprises the plurality of switches. Within each leg, the plurality of switches are arranged in the same configuration.

Each leg 220*a* is arranged as follows. There is a first branch between points U1 and N1 which comprises two nodes P1 and S1. Switch M11 is coupled between node P1 and P2, and switch M12 is coupled between node S1 and point N1. A capacitor C is arranged in a second branch, parallel to the first branch, extending only between the nodes P1 and S1. The path from P1 to the capacitor C comprises switch M15. Finally, a third branch, arranged in parallel to the first branch and the second branch, comprises switches M13 and M14 coupled in series. Between switches M13 and M14, there is a third node U which leads to the output of the inverter 130*a*.

The leg 230*a* comprises switches M16, M17, M18, M19, M20; and the leg 240*a* comprises switches M21, M22, M23, M24, M25. Legs 230*a* and 240*a* comprise the same switch arrangement as leg 220*a*. This configuration for the first example inverter 130*a* does not require additional control loops. This means that the inverter 130*a* can respond faster to changes in the control signal CS1 and the complexity of the circuit for inverter 130*a* is reduced.

The inverter 130*a* comprises a plurality of switches which are operated by the control signal CS1 generated by the controller 110 of FIG. 1. The inverter 130*a* is configured to operate in a first phase and a second phase.

FIG. 2(*b*) shows a second example embodiment of an inverter 130*b* that can be controlled by controller 110 of FIG. 1. The inverter 130*b* comprises a battery 210 coupled to a capacitor DC-link. The inverter 130*b* further comprises one or more legs 220*b*, 230*b*, 240*b* which comprises the plurality of switches. Within each leg, the plurality of switches are arranged in the same configuration.

Each leg 220*b* is arranged as follows. There is a first branch between points U1 and N1 which comprises two nodes P1 and S1. Switch M11 is coupled between node P1 and P2, and switch M12 is coupled between node S1 and point N1. A capacitor C is arranged in a second branch, parallel to the first branch, extending only between the nodes P1 and S1. The path from P1 to the capacitor C comprises a diode D. The diode D could be, for example, a passive diode. Finally, a third branch, arranged in parallel to the first branch and the second branch, comprises switches M13 and M14 coupled in series. Between switches M13 and M14, there is a third node U which leads to an output of the inverter 130*b*.

Legs 230*b* and 240*b* comprise the same configuration as leg 220*b*. The replacement of a switch with diode D in the second embodiment of the inverter 130*b* reduces the number of GDUs required in driver 120. This configuration for the second example inverter 130*b* results in a charge build-up on the capacitor C which can increase ripple effects across it. Therefore, the use of inverter 130*b* is preferable only for apparatuses where the induced ripple effects are negligible in comparison to the benefits of reducing the number of GDUs in driver 120.

The inverter 130*b* comprises a plurality of switches which are operated by the control signal CS1 generated by the controller 110 of FIG. 1. The inverter 130*b* is configured to operate in a first phase and a second phase.

Figure 3A:
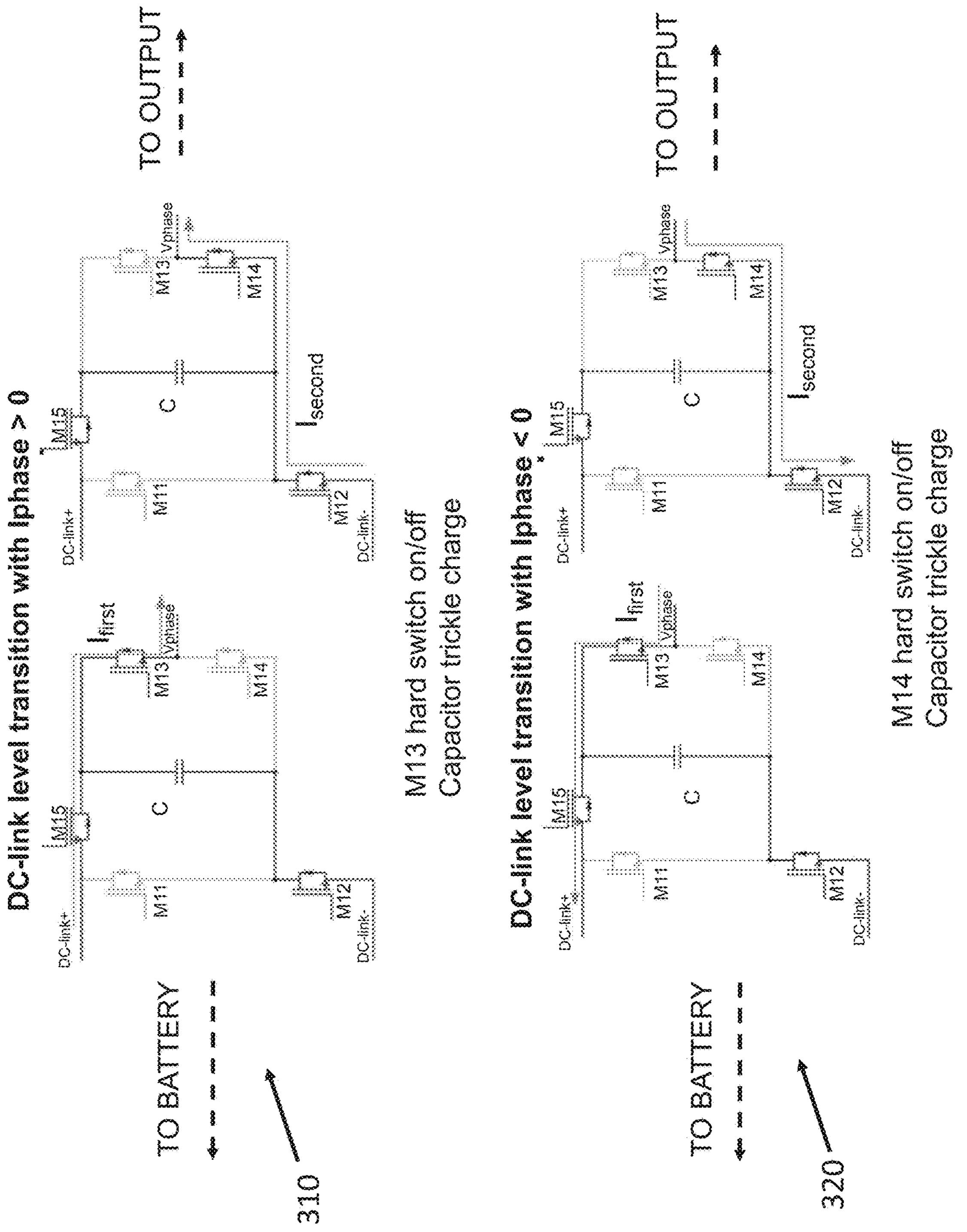
FIG. 3(*a*) is a diagram of a first switching pattern in the first example embodiment of the inverter.
Figure 3B:
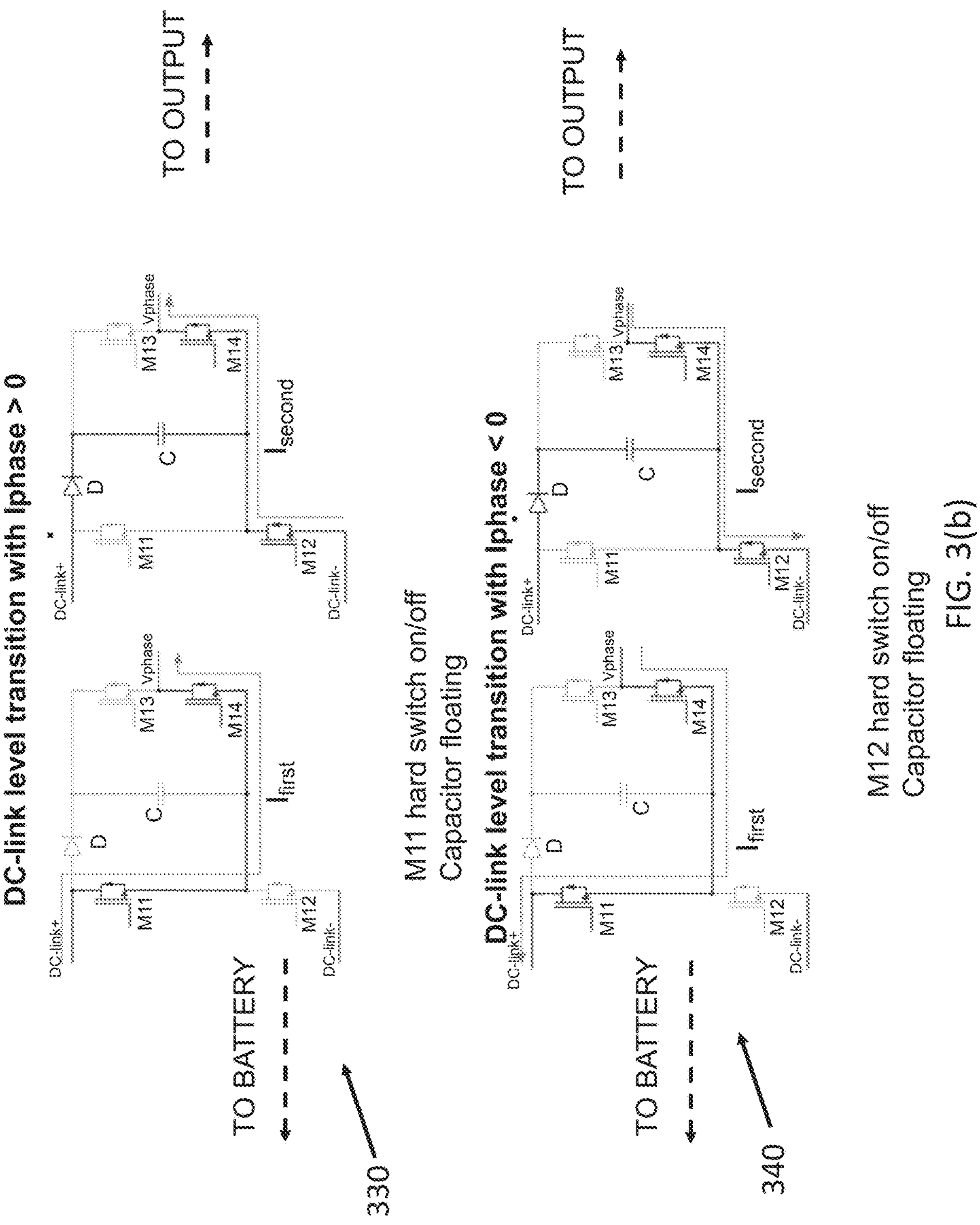

FIG. 3(*a*) is a diagram showing how the controller 110 operates the plurality of switches in a first switching pattern for the first example inverter 130*a*. The first phase of the inverter 130*a* is shown in row 310 and the second phase of the inverter 130*a* is shown in row 320. Although shown for the leg 220*a*, it will be appreciated that the switching pattern as illustrated in FIG. 3(*a*) may additionally, or alternatively, be applied to the leg 230*a* and/or the leg 240*a*, in accordance with the understanding of the skilled person.

When the plurality of switches are operated in the first switching pattern, a current $I_{phase}$ flowing through the inverter 130*a* switches between a first current path $I_{first}$ and a second current path $I_{second}$ in each of the first and second phases. During the first phase, the current flowing in the inverter flows from the battery to the output. During the second phase, the current flowing in the inverter flows from the output to the battery.

For the first switching pattern for the inverter 130*a*, the first current path $I_{first}$ and the second current path $I_{second}$ are the same for both the first and the second phases of the inverter 130*a*. The first current path $I_{first}$ for inverter 130*a* comprises a first switch M15 and a second switch M13. The second current path $I_{second}$ for inverter 130*a* comprises a third switch M12 and a fourth switch M14. The control signal CS1 generated by controller 110 alternately switches the current between the first current path $I_{first}$ and the second current path $I_{second}$ by alternately switching the second switch M13 and the fourth switch M14 between an on state and an off state. In other words, when the second switch M13 is in the on state then the fourth switch M14 is in the off state. When the second switch M13 is in the off state then the fourth switch M14 is in the on state. The switching is hard switching and the capacitor C charging is trickling.

In an alternative embodiment of the first switching pattern in inverter 130*a*, the switches M11 and M14 could be alternately switching between the on state and the off state and switches M12, M13 and M15 remain in the off state with the capacitor C floating. In another alternative embodiment of the first switching pattern in inverter 130*a*, the switches M12, M13 and M14 could be alternately switching between the on state and the off state, M11 would remain in the off state and switch M15 would remain in the on state. The capacitor C in this embodiment may be referred to as being in a "power path".

FIG. 3(*b*) is a diagram showing how the controller 110 operates the plurality of switches in a first switching pattern for the second example inverter 130*b*. The first phase of the inverter 130*b* is shown in row 330 and the second phase of the inverter 130*b* is shown in row 340. Although shown for the leg 220*b*, it will be appreciated that the switching pattern as illustrated in FIG. 3(*b*) may additionally, or alternatively, be applied to the leg 230*b* and/or the leg 240*b*, in accordance with the understanding of the skilled person.

When the plurality of switches are operated in the first switching pattern, a current $I_{phase}$ flowing through the inverter 130*b* switches between a first current path $I_{first}$ and a second current path $I_{second}$ in each of the first and second phases. During the first phase, the current flowing in the inverter 130*b* flows from the battery to the output. During the second phase, the current flowing in the inverter flows from the output to the battery.

For the first switching pattern for the inverter 130*b*, the first current path $I_{first}$ and the second current path $I_{second}$ are the same for both the first and the second phases of the inverter 130*b*. The first current path $I_{first}$ for inverter 130*b* comprises a first switch M11 and a second switch M14. The second current path $I_{second}$ for inverter 130*b* comprises the second switch M14 and a third switch M12. The control signal CS1 generated by controller 110 alternately switches the current between the first current path $I_{first}$ and the second current path $I_{second}$ by alternately switching the first switch M11 and the third switch M12 between an on state and an off state. In other words, when switch M11 is in the on state then switch M12 is in the off state. When switch M11 is in the off state then switch M12 is in the on state. The switching is hard switching and the capacitor C charging is trickling.

In an alternative embodiment of the first switching pattern for the inverter 130*b*, the switches M13 and M14 could be alternately switching between the on state and the off state, switch M12 would remain in the on state and switch M11 in the off state. The capacitor C in this embodiment would be trickled for the commutation to VDD for currents $I_{phase}$ greater than zero.

Figure 4A:
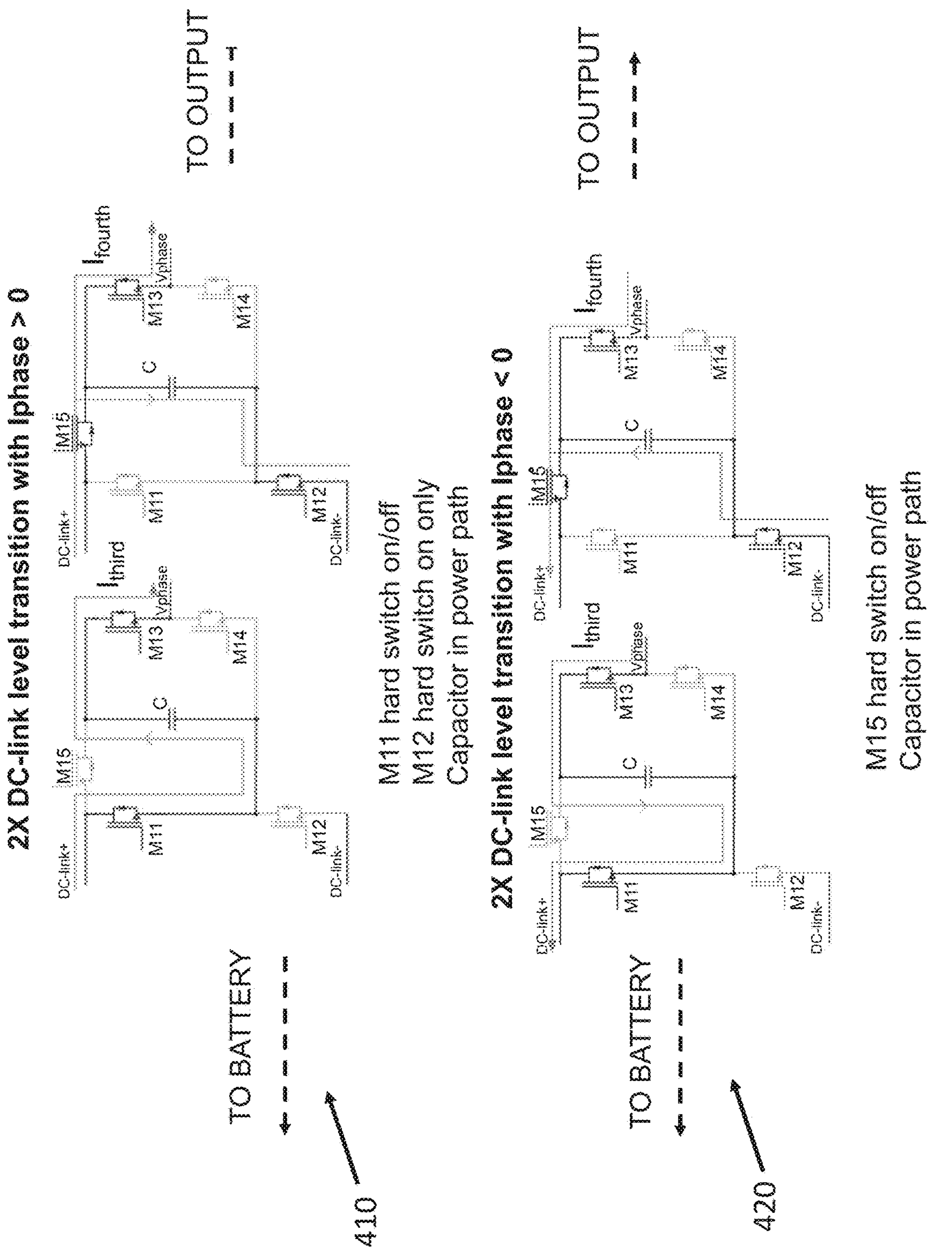
FIG. 4(*a*) is a diagram of a second switching pattern in the first example embodiment of the inverter.
Figure 4B:
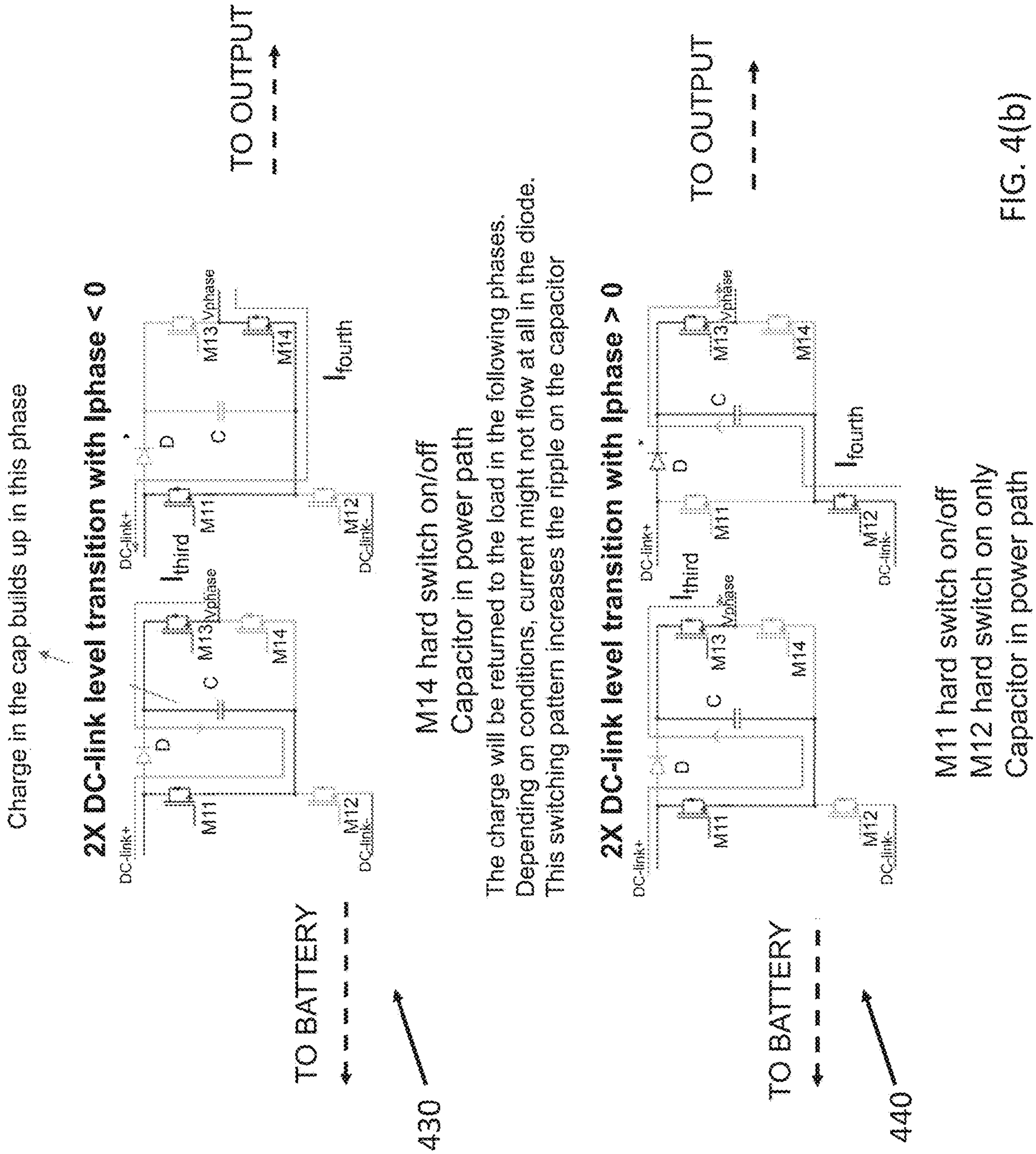

FIG. 4(*a*) is a diagram showing how the controller 110 operates the plurality of switches in a second switching pattern for the first example inverter 130*a*. The first phase of the inverter 130*a* is shown in row 410 and the second phase of the inverter 130*a* is shown in row 420. Although shown for the leg 220*a*, it will be appreciated that the switching pattern as illustrated in FIG. 4(*a*) may additionally, or alternatively, be applied to the leg 230*a* and/or the leg 240*a*, in accordance with the understanding of the skilled person.

When the plurality of switches are operated in the second switching pattern, a current $I_{phase}$ flowing through the inverter 130*a* switches between a third current path $I_{third}$ and a fourth current path $I_{fourth}$ in each of the first and second phases. During the first phase, the current flowing in the inverter flows from the battery to the output. During the second phase, the current flowing in the inverter flows from the output to the battery.

For the second switching pattern for the inverter 130*a*, the third current path $I_{third}$ and the fourth current path $I_{fourth}$ are the same for both the first and the second phases of the inverter 130*a*. The third current path $I_{third}$ for inverter 130*a* comprises a first switch M11, a second switch M13 and a capacitor C. The fourth current path $I_{fourth}$ for inverter 130*a* comprises the second switch M13, a third switch M12, a fourth switch M15 and the capacitor C. The control signal CS1 generated by controller 110 alternately switches the current between the third current path $I_{third}$ and the fourth current path $I_{fourth}$ by alternately switching the first switch M11 and the third M12 and the fourth M15 switches between an on state and an off state. In other words, when the second switch M13 is in the on state then the third M12 and fourth M15 switches are in the off state. When the second switch M13 is in the off state then the third M12 and fourth M15 switches are in the on state. The switching is hard switching for switches M15 and M11. Switch M12 has hard switching into the on state only and the capacitor C charging is in a power path.

In an alternative embodiment of the second switching pattern in inverter 130*a*, the switches M11 and M14 are alternately switching between the on state and the off state and switches M12, M13 and M15 are in the off state. The capacitor C in this embodiment is floating for the commutation to VDD.

FIG. 4(*b*) is a diagram showing how the controller 110 operates the plurality of switches in the second switching pattern for the second example inverter 130*b*. The second phase of the inverter 130*b* is shown in row 430 and the first phase of the inverter 130*b* is shown in row 440. Although shown for the leg 220*b*, it will be appreciated that the switching pattern as illustrated in FIG. 4(*b*) may additionally, or alternatively, be applied to the leg 230*b* and/or the leg 240*b*, in accordance with the understanding of the skilled person.

When the plurality of switches are operated in the second switching pattern, a current $I_{phase}$ flowing through the inverter 130*b* switches between a third current path $I_{third}$ and a fourth current path $I_{fourth}$ in each of the first and second phases. During the first phase, the current flowing in the invert flows from the battery to the output. During the second phase, the current flowing in the inverter flows from the output to the battery.

For the second switching pattern for the inverter 130*b*, the third current path $I_{third}$ is the same for both the first and second phases of the inverter 130*b*. The fourth current path $I_{fourth}$ is different for the first and the second phases of the inverter 130*b*. The third current path $I_{third}$ for inverter 130*b* comprises a first switch M11, a second switch M13 and a capacitor C. During the second phase 430, the fourth current path $I_{fourth}$ for inverter 130*b* comprises the first switch M11 and a third switch M14. In the second phase, the charge in capacitor C builds up. During the first phase 440, the fourth current path $I_{fourth}$ for inverter 130*b* comprises the second switch M13, a fourth switch M12 and the capacitor C. In the first phase, the charge stored in capacitor C is returned to load. During this phase, the current might not flow at all through the diode D. The switching pattern in this phase increases the ripple across the capacitor C. The control signal CS1 generated by controller 110 alternately switches the current between the third current path $I_{third}$ and the fourth current path $I_{fourth}$ during the second phase by alternately switching the second switch M13 and the third switch M14 between the on state and the off state. In other words, when the second switch M13 is in the on state, the third switch M14 is in the off state. When the second switch M13 is in the off state, then the third switch M14 is in the on state. Switch M14 has hard switching and the capacitor C is in the power path. The control signal CS1 generated by controller 110 alternately switches the current between the third current path $I_{third}$ and the fourth current path $I_{fourth}$ during the first phase by alternately switching the first switch M11 and the fourth switch M12 between the on state and the off state. In other words, when switch M11 is in the on state then switch M12 is in the off state. When switch M11 is in the off state then switch M12 is in the on state. Switch M11 has hard switching, whilst switch M12 has hard on switching only. The capacitor C is in the power path.

In an alternative embodiment of the second switching pattern in inverter 130*b*, switches M11 and M14 are alternately switching between the on state and the off state. Switches M12, M13 and M15 are in the off state and the capacitor C is floating for the commutation to VDD.

Figure 5:
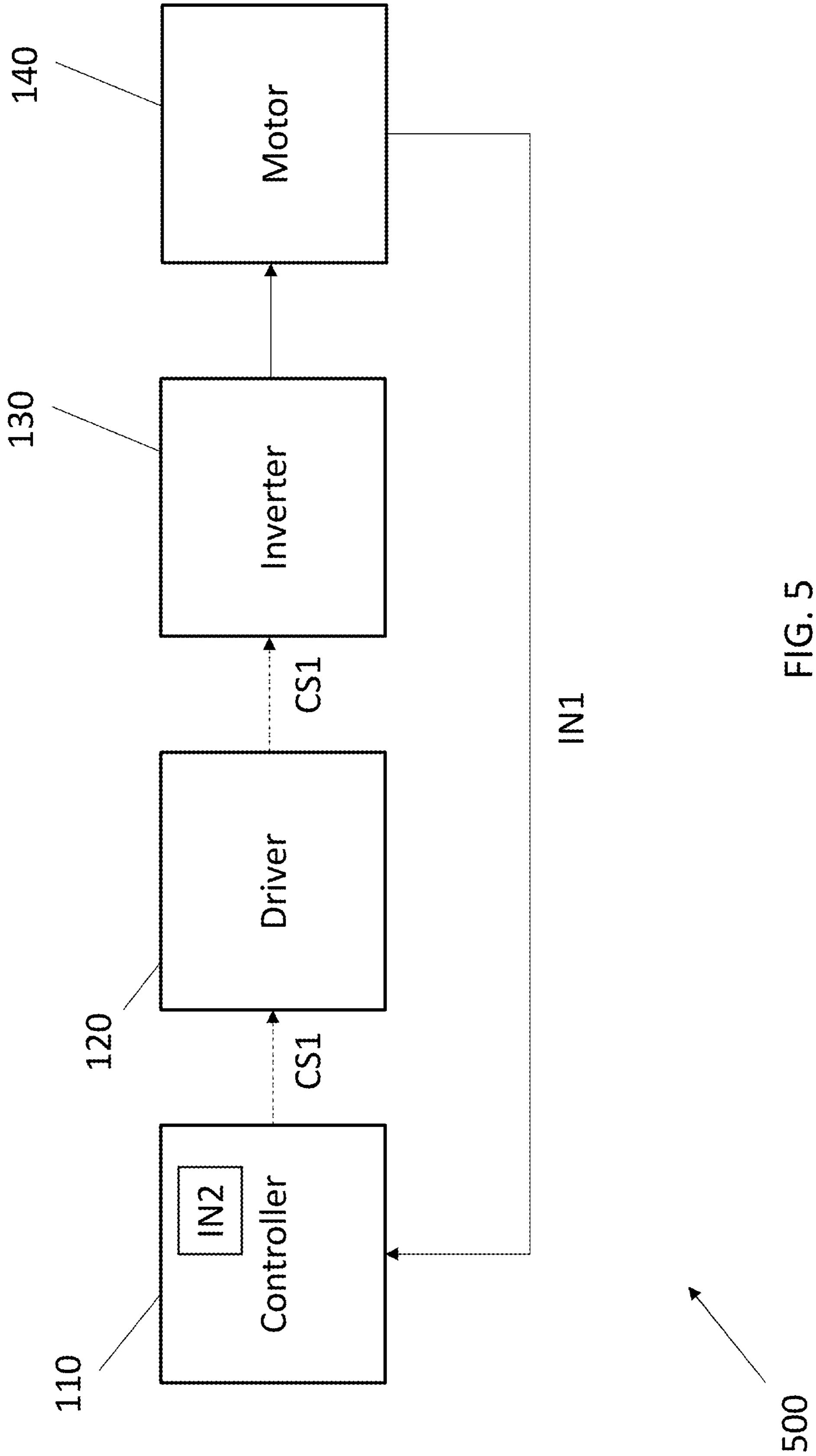
FIG. 5 is a diagram of an electric vehicle power system comprising the controller of the present disclosure.

FIG. 5 is a diagram of an electric vehicle power system (EVPS) 500 comprising the controller 110 of the present disclosure. The EVPS 500 also comprises a driver 120 and an inverter 130 and is configured to drive a motor 140. The inverter 130 comprises a plurality of switches. The inverter 130 could be, for example, the inverter 130*a* of FIG. 2(*a*) or the inverter 130*b* of FIG. 2(*b*). The controller 110 is configured to generate a control signal CS1 wherein the control signal operates the plurality of switches in a first switching pattern or a second switching pattern. The controller 110 sends the control signal CS1 to a driver 120. The driver 120 processes the signal in order to operate the plurality of switches within the inverter 130. The driver 120 could comprise, for example, a number of GDUs. The number of GDUs is equal to the number of switches within the inverter 130.

The controller 110 is configured to receive a first input IN1. For the EVPS 500, the first input IN1 received by controller 110 is from motor 140 and is related to the revolutions per minute (RPM) of the motor. For the EVPS 500, the second input IN2 is pre-programmed onto the controller 110. The second input IN2 is a look up table comprising voltages that need to be applied across the inverter 130 in order for the motor 140 to operate at a given RPM and torque value. The maximum voltage that can be applied is limited by the maximum peak in the voltage sinusoid. For example, if the inverter 130 is operating with two level operations, then the maximum voltage is limited to the voltage stored in the battery 210.

In other embodiments, the controller 110 may be configured to receive the second input IN2 during operation from a location external to the controller 110.

The value of the RPM IN1 is used to find the operating voltage from the look-up table IN2 and these two values determines which switching pattern the control signal CS1 operates the plurality of switches in. For example, if the inverter 130 is operating with two level inverter operations and the operating voltage from the look-up table IN2 required for the RPM IN1 is greater than the voltage across the battery 210, the control signal CS1 will then operate the plurality of switches with three level inverter operations. During three level operations for the inverter 130, the maximum voltage is limited to two times the voltage stored in the battery 210. Therefore, during this operation of the plurality of switches the inverter 130 is able to provide the voltage needed for the RPM of the motor.

Figure 6A:
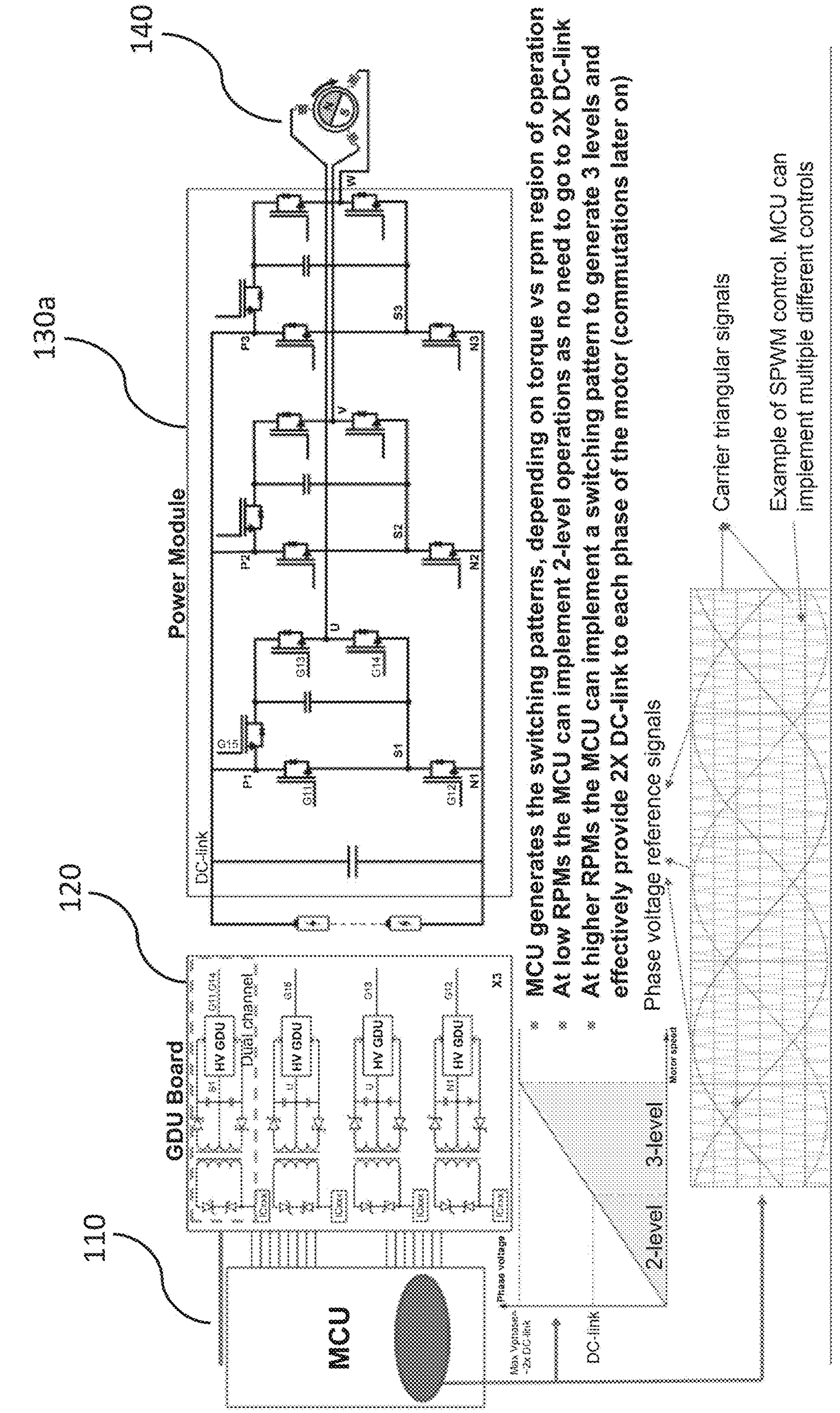
FIG. 6(*a*) is an example embodiment of the controller of the present disclosure for the electric vehicle power system.
Figure 6B:
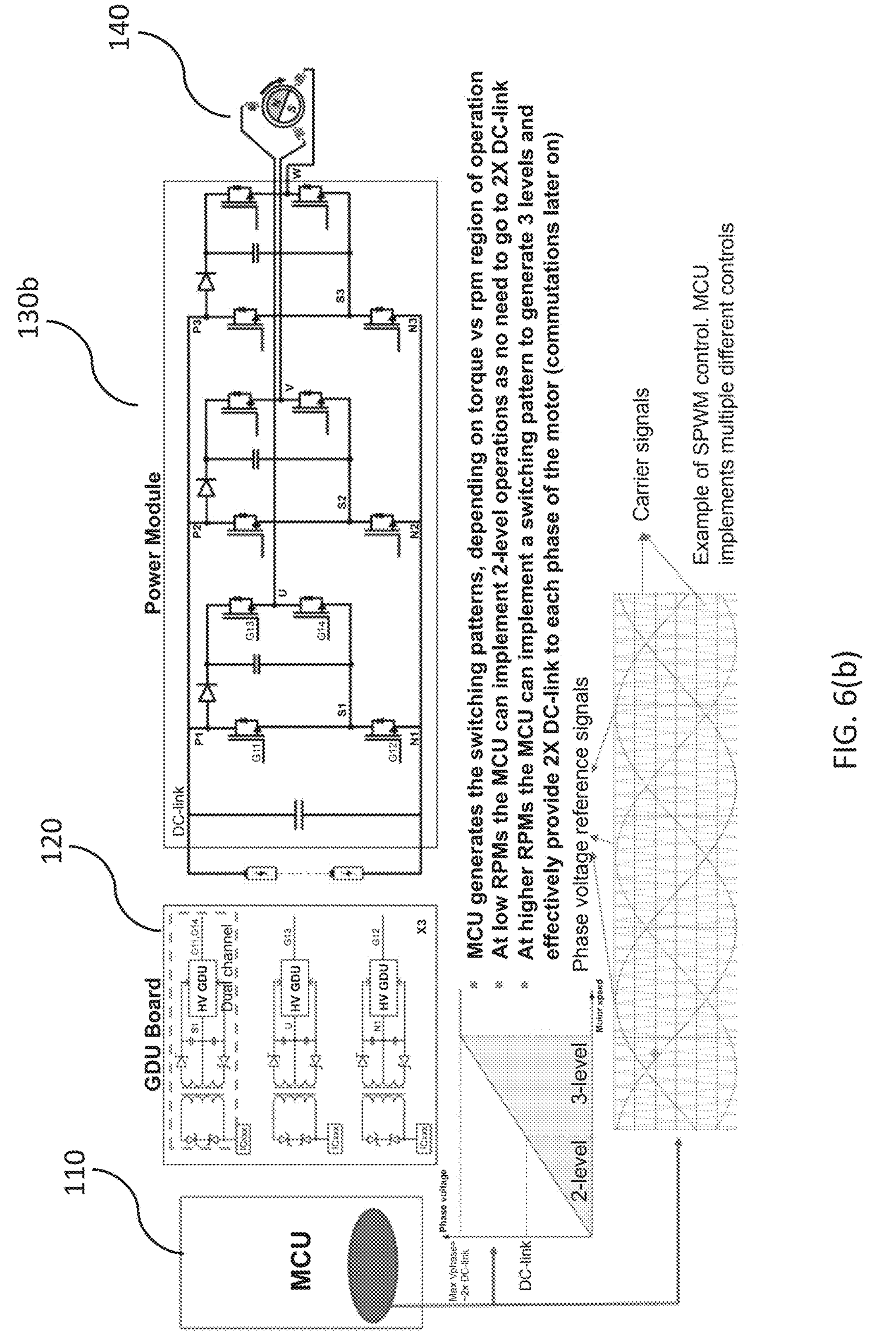

FIG. 6(*a*) and FIG. 6(*b*) are example embodiments of the controller 110 and the driver 120 for the EVPS 500. In FIG. 6(*a*), the driver 120 drives the inverter 130*a* of FIG. 2(*a*) whilst in FIG. 6(*b*) the driver 120 is driving the inverter 130*b* of FIG. 2(*b*). The controller 110 in this embodiment is a microunit controller (MCU). The MCU generates the first switching pattern and the second switching pattern depending on torque versus RPM in the region of operation. At low RPM values for motor 140, the MCU will generate control signal CS1 to implement the first switching pattern. In this example embodiment, the first switching pattern is that of two level inverter operations. At RPM values which require a voltage greater than the charge stored in capacitor DC-link (the battery voltage), the MCU generates control signal CS1 to implement the second switching pattern which is a three level inverter operation. During the three level operations, up to twice the charge of capacitor DC-link can be delivered to the motor 140. The boundary between going from two level to three level inverter operation is dependent upon the specific EVPS configuration, in accordance with the understanding of the skilled person. For example, it depends upon the motor being used, the transmission ratio, the voltage of DC-link and the weight of the car among other factors. In this way, all the components in the EVPS 500 only require a voltage rating equal to that of the voltage stored across the capacitor DC-link as only the motor experiences twice the charge.

Figure 7:
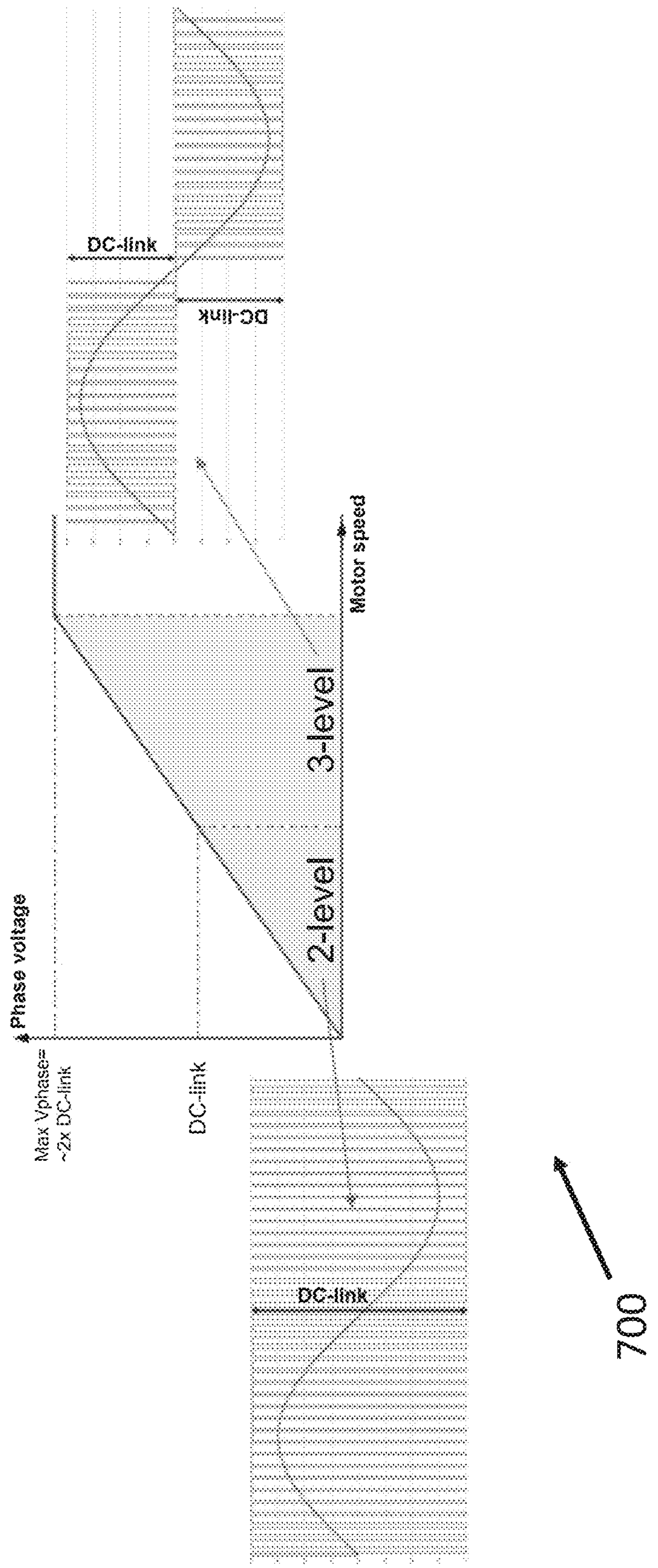
FIG. 7 is a plot showing the relationship between the first switching pattern, the second switching pattern, a first input and a second input.

FIG. 7 is a plot 700 showing when the controller 110 of EVPS 500 switches between the 2 level inverter switching pattern and three level inverter switching pattern.

For the embodiment of the EVPS 500 shown in FIG. 5, it is understood that the system can be operated with the same power $P_{out}$ using half the current $I_{phase}$ value and double the switching frequency. This is the optimum use of the proposed EVPS 500 of FIG. 5, however other uses can be implemented. When compared with a prior art two level inverter of a certain power, the controller 110 and the configuration of switches in inverters 130*a* and 130*b* of the present disclosure allows the EVPS 500 to provide the motor 140 with the same electric power that a conventional two level inverter was designed for, but with half the current $I_{phase}$ (since the motor 140 is operating at double the voltage) and double the inverter switching frequency. Therefore, the overhead from the inverter 130 is kept to a minimum. Specifically, the overhead due to additional switches in the power module and additional floating capacitors is minimised. By taking advantage of doubling the DC-link voltage and improving the motor 140 power density with negligible cost for the overall EVPS 500. There is a reduction in the overall cost and improvements the driving range of the electric vehicle. With the controller 110 of the present disclosure, a saving of up to 75% conduction losses in the motor 140 windings can be made and potentially up to a theoretical 50% switching losses saving also. Doubling the switching frequency of the inverter 130 and saving on switching losses, improves the performance of the motor 140 (finer torque control, faster dynamics, optimisation of the magnetic material, lower distortion and electromagnetic interference (EMI).

$$P_{out} \propto (2 * V_{phase}) * \left(\frac{I_{phase}}{2}\right) \tag{1}$$

This can be achieved whilst keeping the maximum rate of change of phase voltage $V_{phase}$, with time dv/dt across each switch in the plurality of switches the same. Therefore the transition time can be halved with the same EMI performance of a two level inverter. Since the rate of change of the phase current $I_{phase}$ with time (di/dt) of each switch is halved as well this means that the switching power loss is:

$$P_{sw} \propto 0.5 * V_{DC\,link} * \left(\frac{I_{pk}}{2}\right) * (2 * f_{sw}) * (0.5 * tr) \tag{2}$$

Where $I_{pk}$ is the peak value of $I_{phase}$, $f_{sw}$ is the switching frequency and tr is the transition time.

Therefore the switching frequency can be doubled whilst achieving approximately a 50% switching losses reduction. In practice, the switching losses save is a bit less when the inverter 130 is controlled in three level operations as the losses from the floating capacitors themselves and the switching pattern are taken into consideration.

Figure 8:
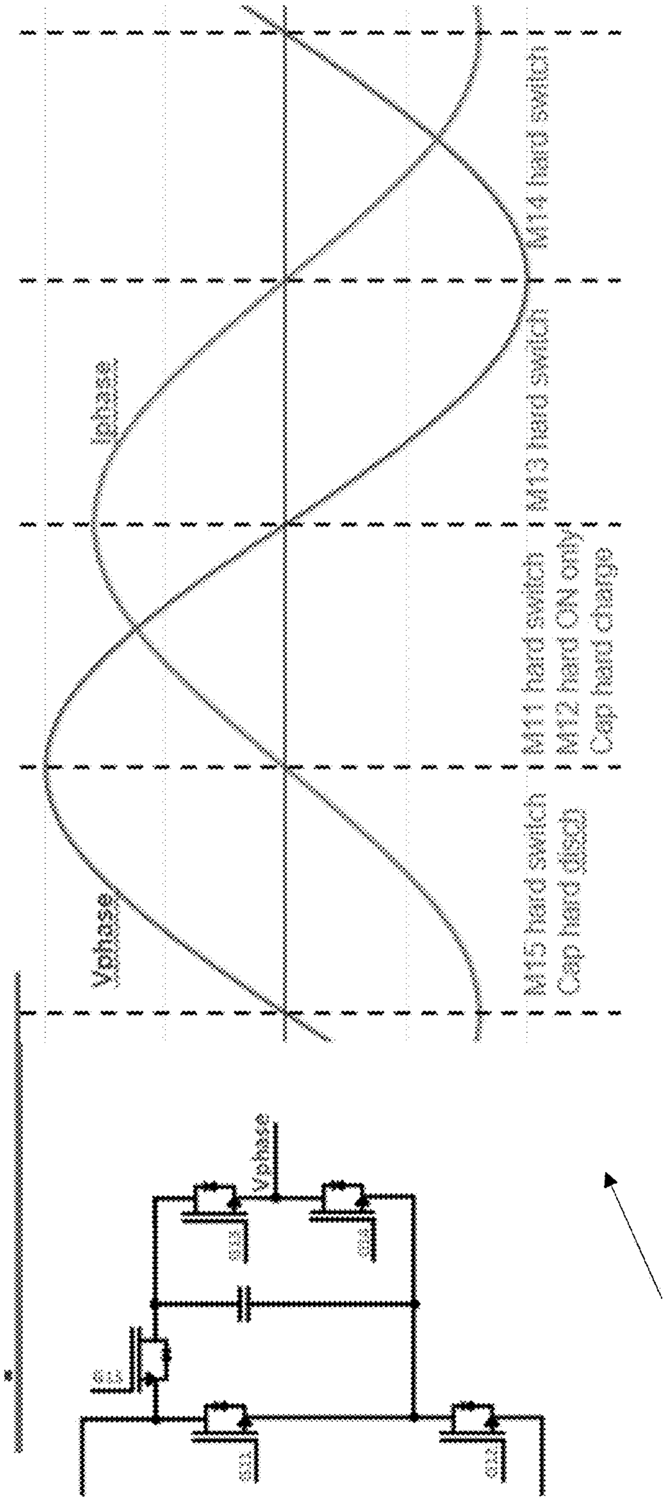
FIG. 8 is a plot showing the impact of the second switching pattern on switching losses on the inverter.

FIG. 8 is a plot 800 showing the impact of three level operations on switching losses for the inverter 130*a* in FIG. 2(*a*). The plot is split into the first phases and second phases for the second switching pattern shown in FIG. 4(*a*) which shows three level switching operations. The number of hard switching events is the same as in the two level operations case, with the exception of M12 hard switch ON, which therefore occurs at $f_{sw}/8$. In this transition M12 switches ON to charge the floating cap C. Therefore the switching losses depend on the RC time constant and the peak current $I_{pk}$.

The floating cap does a cycle of hard charge/discharge with at $f_{sw}/4$:

$$\frac{\text{Psw\_loss\_3L}}{\text{Psw\_loss\_2L}} = \frac{6 * 0.5 * DClink * \frac{Ipk}{2} * 2fsw * \frac{tr}{2} + \overbrace{3 * 0.5 * DClink * \frac{Ipk}{2} * \frac{2fsw}{8} * \frac{tr}{2}}^{M12} + \overbrace{3 * Cfloat * \Delta V^2 * \frac{2fsw}{4}}^{\text{Floating cap}}}{6 * 0.5 * DClink * Ipk * fsw * tr} = \frac{1}{2} + \frac{1}{16} + \frac{Cfloat * \Delta V^2}{4 * DClink * Ipk * tr} \tag{3}$$

Worst case as probably $M12$ turns ON with low current (annotation pointing to $\frac{1}{16}$)

Improved EVPS 500 efficiency allows for saving on a cooling system of an EV. All of this reflects on saving on the battery 210 (or improved range) with the potential of cost saving that offsets the additional cost coming from the inverter 130.

The electric power $P_{out}$ provided to the motor 140 is proportional to the phase voltage $V_{phase}$ times the phase current $I_{phase}$. In a conventional two level inverter, the maximum $V_{phase}$ is ideally the voltage across capacitor DC-link (in other words, the battery 210 voltage). Since the controller 110 for inverter 130 is able to double that, same power can be kept whilst providing half the current $I_{phase}$ to each phase:

Where Cfloat is the value of the floating capacitor C and ΔV is the ripple on the floating capacitor.

In a simulated example, where controller 110 and inverter 130*a* of the present disclosure was compared to a conventional two level inverter providing 100 KW at 400V DClink tr=200 nSec and where a Cfloat=100 uF resulted in max 10V ΔV, that ratio is 0.625. This equates to a switching loss save of about 40%.

Figure 9:
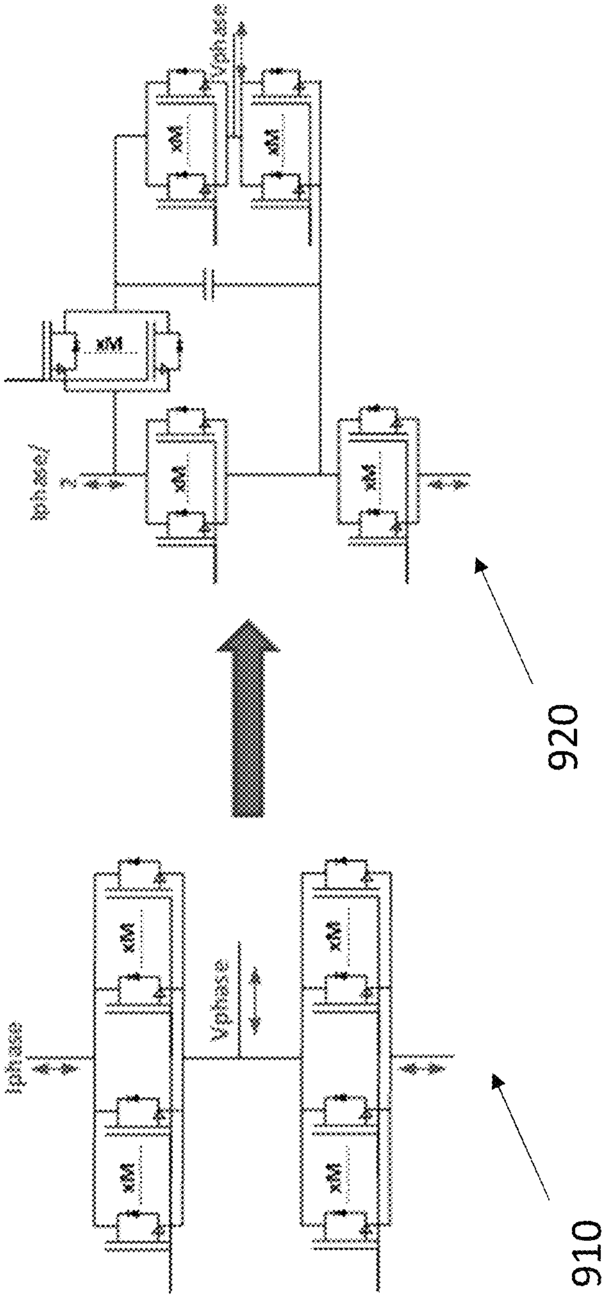
FIG. 9 is a diagram showing the benefit of providing the same power with half the current for an electric vehicle power system.

FIG. 9 is a diagram showing the benefit of providing the same power with half the current for an electric vehicle power system using the controller 110 of the present disclosure. A conventional two level inverter is shown on the left hand side 910 and the inverter 130 that can be used with controller 110 is shown on the right hand side 920.

The power module of a two level traction inverter 910 is designed to provide a certain electric power with a certain number 2*M of parallel SiC/IGBT dies per switch. The dies can be reconfigured into the inverter 920 and hence the current density/thermal performance will stay exactly the same for half the current. For example, if M=4 then 16 dies are needed per leg in the conventional two level inverter 910 but only 20 are needed for the controller 110 and inverter 130 of the present disclosure.

The control signal CS1 generated by the controller 110 of the present disclosure to operates two switches in series at every commutation. The resistance of 2*M dies in parallel RDSon, then for 920 there are 2 switches of 2*RDSon in series. The RMS $I_{RMS}$ of the phase current is halved, so the conduction losses stay the same:

$$\left(\frac{I_{RMS}}{2}\right)^2 * (2*RDSon + 2*RDSon) = I_{RMS}^2 * RDSon \tag{4}$$

If the motor 140 is driven with half the phase current $I_{phase}$, then the conduction losses in the windings of the motor 140 can be reduced up to 75% (neglecting other effects when the switching frequency is doubled):

$$\left(\frac{I_{RMS}}{2}\right)^2 * R_w = \frac{I_{RMS}^2}{4} * R_w \tag{5}$$

Where $R_w$ is the resistance in the windings of the motor 140.

Alternatively, smaller windings for the motor 140 can be chosen where the windings have a smaller cross section. This can save cost and reduce the total cross section of the motor 140 and making it lighter.

If the switching frequency is doubled, then it can be assumed that the DC-link capacitor value can be halved to keep the same ripple performance at the input of the inverter 130. The half of the saved DC-link capacitor can be used to implement the three floating capacitors needed to generate the three level inverter 130. For example, a typical DC-link capacitance for a 100 KW, 400V two level conventional inverter is in the order of 500-600 uF. A 100 uF capacitance for the floating cap for the controller 110 and inverter 130 of the present disclosure would keep the ripple across the floating cap within 10V and leave a 200-300 uF for the DC-link capacitance with no performance degradation.

The controller 110 of the present disclosure when implemented in an electric vehicle power system (EVPS) such as the one shown in FIG. 5 can be used to provide more power to the motor 140 without needed to upgrade the entire electric vehicle system. For example, if the controller 110 and inverter 130 of the present disclosure was used to provide the same current per phase then approximately double the electric power is provided to the motor 140. This example implementation can result in a larger overhead.

It is understood that the optimal use of the EVPS 500 of the present disclosure is to provide the same output power for half the phase current $I_{phase}$ and double the switching frequency. Other uses of the system are possible, even if not explicitly disclosed here. A few example are provided here, this list is not exhaustive.

Another example use it to provide same output power to the motor at half the phase current $I_{phase}$, without doubling the switching frequency. More switching losses are saved, but bill of materials (BOM) increased due to not being able to save on the capacitor DC-link/or accept higher ripple on the capacitor DC-link. A third example is to provide higher output power with reduced phase current $I_{phase}$ and unchanged switching frequency for a moderate save in switching losses and moderate save in motor winding conduction losses, and still increased BOM due to not being able to save on the capacitor DC-link/or accept higher ripple on the DC-link and increased number of dies in the power module. Or to provide double the power with the disadvantages shown above.

The controller 110 of the present disclosure allows for the inverter 130 to provide the same electric power to the motor 140 with half the phase current $I_{phase}$ of the prior art and double the switching frequency. This leads to a smaller hardware overhead and allows for the optimisation of certain components of, for example an electric vehicle, such as the cooling system, the electric motor and (if the range is to be kept constant) the battery pack. The controller 110 and embodiments of inverters 130*a* and 130*b* of the present disclosure can also provide a higher voltage the electric motor without needing to upgrade the other components in the EV power system to high voltage rating components (apart from the electric motor itself) and with relatively small overhead. Therefore the embodiments of the present disclosure avoid the cost of upgrading the whole EV power system (including the battery pack) to higher voltages or the use of complex and expensive DC/DC converters between the battery and the inverter. This is achieved with minimum complexity and no control loops, meaning that the dynamic performances are not affected. Further, the embodiments of the present disclosure achieve higher voltages provided to the motor without increasing the actual rate of change of the voltage dv/dt experienced by the switching elements or the motor windings. Therefore there is no penalty on switching losses, on EMI, or on reliability.

It will be appreciated that inverters of the present disclosure may be traction inverters for passenger EVs. Further embodiments may relate to inverters for other applications and for other input voltages, in accordance with the understanding of the skilled person.

Various improvements and modifications may be made without departing from the scope of the disclosure.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A controller for an inverter, the inverter comprising a plurality of switches, the controller configured to generate a control signal wherein the control signal operates the plurality of switches in a first switching pattern or a second switching pattern, each switching pattern corresponding to a distinct arrangement of the plurality of switches, with certain switches being in an on state and others being in an off state, to establish different current paths through the inverter wherein the inverter is configured to operate in a first phase and a second phase, wherein when the plurality of switches are operated in the first switching pattern, a current flowing through the inverter switches between a first current path and a second current path, wherein during the first phase the current flowing through the inverter flows from a battery to an output and during the second phase the current flowing through the inverter flows from the output to the battery.

2. The controller of claim 1, wherein the controller is configured to receive a first input and/or a second input.

3. The controller of claim 2, wherein the control signal operates the plurality of switches in the first switching pattern if the first input is less than the second input.

4. The controller of claim 3, wherein the control signal operates the plurality of switches in the second switching pattern if the first input is greater than the second input.

5. The controller of claim 1, wherein the first current path comprises a first switch and a second switch and the second current path comprises a third switch and a fourth switch.

6. The controller of claim 5, the generated control signal switches the current flow between the first current path and the second current path by alternately switching the second switch and the fourth switch between an on state and an off state.

7. The controller of claim 1, wherein the first current path comprises a first switch and a second switch and the second current path comprises the second switch and a third switch.

8. The controller of claim 7, the generated control signal switches the current flow between the first current path and the second current path by alternately switching the first switch and the third switch between an on state and an off state.

9. The controller of claim 1, wherein when the plurality of switches are arranged in the second switching pattern, a current flowing through the inverter switches between a third current path and a fourth current path.

10. The controller of claim 9, wherein during the first phase the current flowing through the inverter flows from a battery to an output and during the second phase the current flowing through the inverter flows from the output to the battery.

11. The controller of claim 10, wherein the third current path comprises a first switch, a second switch and a capacitor and the fourth current path comprises the second switch, a third switch, a fourth switch and the capacitor.

12. The controller of claim 11, wherein the generated control signal switches the current flow between the third current path and the fourth current path by alternately switching the first switch and the third switch and the fourth switch between an on state and an off state such that the third switch and the fourth switch are always in the same state.

13. The controller of claim 10, wherein the third current path comprises a first switch, a second switch and a capacitor.

14. The controller of claim 13, wherein during the second phase the fourth current path comprises the first switch and a third switch and during the first phase the fourth current path comprises the second switch, a fourth switch and the capacitor.

15. The controller of claim 14, wherein during the second phase the generated control signal switches the current flow between the third current path and the fourth current path by alternately switching the second switch and the third switch between an on state and an off state and wherein during the first phase the generated control signal switches the current flow between the third current path and the fourth current path by alternately switching the first switch and the fourth switch between an on state and an off state.

16. An apparatus comprising: an inverter comprising a plurality of switches; and a controller for the inverter, the controller configured to generate a control signal wherein the control signal operates the plurality of switches in a first switching pattern or a second switching pattern, each switching pattern corresponding to a distinct arrangement of the plurality of switches, with certain switches being in an on state and others being in an off state, to establish different current paths through the inverter, wherein the inverter is configured to operate in a first phase and a second phase, wherein when the plurality of switches are operated in the first switching pattern, a current flowing through the inverter switches between a first current path and a second current path, wherein during the first phase the current flowing through the inverter flows from a battery to an output and during the second phase the current flowing through the inverter flows from the output to the battery.

17. The apparatus of claim 16 being an electric vehicle power system.

18. A method of controlling an inverter comprising a plurality of switches, the method comprising: generating, using a controller, a control signal to operate the plurality of switches in a first switching pattern or a second switching pattern, each switching pattern corresponding to a distinct arrangement of the plurality of switches, with certain switches being in an on state and others being in an off state, to establish different current paths through the inverter, wherein the inverter is configured to operate in a first phase and a second phase, wherein when the plurality of switches are operated in the first switching pattern, a current flowing through the inverter switches between a first current path and a second current path, wherein during the first phase the current flowing through the inverter flows from a battery to an output and during the second phase the current flowing through the inverter flows from the output to the battery.

* * * * *